United States Patent [19]

Plachy et al.

[11] 4,284,250
[45] Aug. 18, 1981

[54] TAPE DRIVE HAVING AN IMPROVED REEL LATCH

[75] Inventors: Ivo T. Plachy, San Mateo, Calif.; Jack W. Clymer; Richard W. Pembroke, both of Tulsa, Okla.

[73] Assignee: Telex Computer Products, Inc., Tulsa, Okla.

[21] Appl. No.: 129,832

[22] Filed: Mar. 13, 1980

[51] Int. Cl.³ .......................................... B65H 17/02
[52] U.S. Cl. ................................................. 242/68.3
[58] Field of Search ...................... 242/68.3, 68.2, 72, 242/72.1, 129.5, 129.7

[56]  References Cited
U.S. PATENT DOCUMENTS

| 3,307,797 | 3/1967 | McFeaters | 242/68.3 |
| 3,366,343 | 1/1968 | Mossamer | 242/68.3 |
| 3,544,027 | 12/1970 | Green | 242/68.3 |
| 3,833,181 | 9/1974 | Watkins | 242/68.3 |
| 3,946,962 | 3/1976 | Deletzke | 242/68.3 |

Primary Examiner—Edward J. McCarthy
Attorney, Agent, or Firm—Head & Johnson

[57] ABSTRACT

A tape drive hub having an improved reel latch, a hub body having a plurality of radial openings communicating with a reel receiving cylindrical surface, a tapered locking member carried axially by the body removable from an unlocked to a locked position, and an actuator received in each of the radial openings, each of the actuators being formed of a cylindrical body having a piston at the outer end and means at the inner end for engaging the locking member, and each actuator cylindrical body including a preloaded spring engaging the piston so that when the locking member is axially advanced into the locked position, each cylindrical body is pushed outwardly to engage the piston end with a reel positioned in the hub, the force of engagement being determined by the preload on each of the actuator springs.

5 Claims, 6 Drawing Figures

TAPE DRIVE HAVING AN IMPROVED REEL LATCH

BACKGROUND OF THE INVENTION

1. Field of the Invention

This invention relates to a tape drive hub of the type utilized on tape drives employed in computer applications. The tape hubs are an important part of a tape drive system since they must provide means for facilitating the expeditious removal and replacement of tape reels as the operator changes tape reels in the use of the computer apparatus. In addition, they must securely engage the tape reels in a non-slip arrangement. Others in the past have provided various types of tape drive hubs, including latching means for securing the reels to the hub. In a typical arrangement, some means is provided which expands outwardly to engage the internal cylindrical surface of the reels. These usually are in the form of members, the outer ends of which are of elastomeric material. The thickness of the elastomeric material is selected such that when the members are moved outwardly as the hub is placed in locked position the elastomeric material is compressed to engage the reel so as to hold it in a non-slip arrangement. The problem with this system is that it depends entirely on the elastomeric material to compress and apply holding force to the reel. Since most reel latching systems can provide only a limited amount of axial displacement of the elastomeric members, the resilient force engaging the reels is limited, and when any wear occurs the reels may be improperly engaged by the hub and allowed to slip.

The present invention overcomes the problems with the prior art by providing an actuator for a hub including a preloaded spring. When the hub is moved to the locked position the reels are always engaged with a preselected compressional force.

2. Description of the Prior Art

As examples of the efforts of others in providing reel latching mechanisms, reference may be had to the following U.S. Pat. Nos. 3,002,705; 3,791,604; 3,857,526; 3,140,061; 3,850,382; 3,946,962; 3,313,561; 3,833,181; 3,863,856.

SUMMARY OF THE INVENTION

A tape drive hub having an improved latch for reels. The hub is supported for rotation about an axis. The hub body has a cylindrical surface of a dimension to slidably receive the internal cylindrical opening of a reel. The body has a plurality of spaced apart radial openings which communicate with the hub cylindrical surface. In each of the radial openings is an actuator. Each actuator body has an axial recess in the outer end thereof. Positioned in the recess is a piston having an outer surface for engaging the internal cylindrical surface of a reel. A spring is received in the recess in each of the actuator bodies, urging the piston in an outward direction. Means is provided for retaining the piston in the recess in the cylindrical body while providing limited axial movement of the piston, the means including provision for maintaining the spring under preselected compression. The hub includes a locking member carried for axial displacement relative to the hub body. The locking member engages the inner ends of each of the actuators when the locking member is moved to locking position, urging the actuator members outwardly so that thereby the outer end of the piston portion of each actuator engages the reel cylindrical surface with a force equal to the prestressed loading of the spring.

DETAILED DESCRIPTION OF THE PREFERRED EMBODIMENT

Figures 1, 1A:
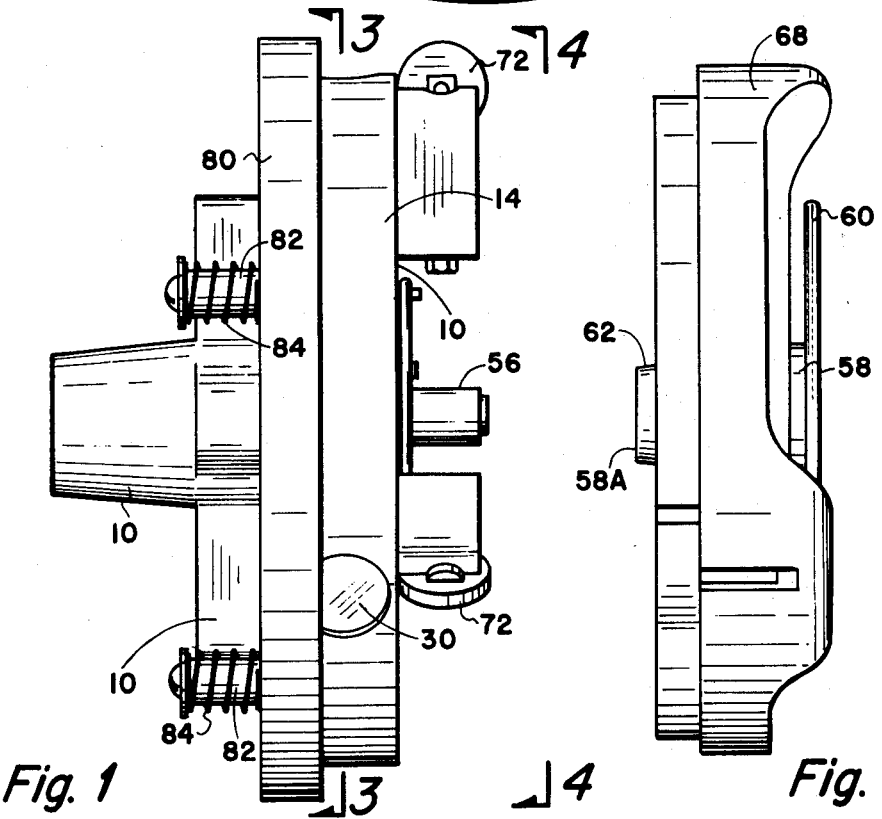
FIG. 1 is an elevational external view of a hub body employing the present invention, the hub body being adaptable for rotation about a shaft and for receiving a tape reel thereon.
FIG. 1A is an external elevational view of a cover utilized with the hub body of FIG. 1, the cover being shown removed from the hub body to show more details of the arrangement of the hub body.
Figure 2:
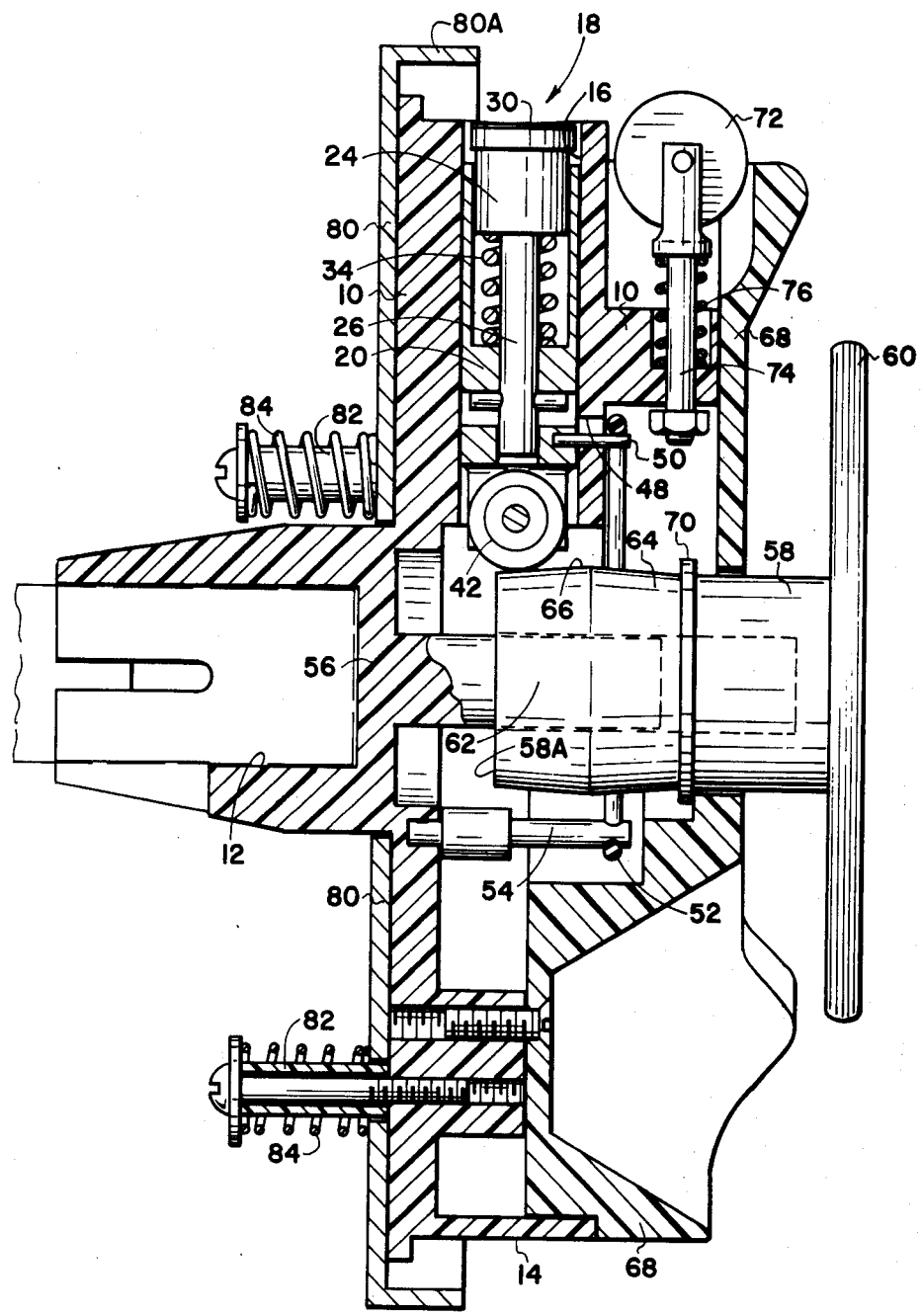
FIG. 2 is an enlarged cross-sectional view of the hub body of FIG. 1 with the cover of FIG. 1A in position on the hub body.

Referring now to FIGS. 1, 1A, and 2, a preferred embodiment of the invention is illustrated. As previously indicated, the invention relates to a hub for rotatably supporting a tape reel in a tape drive. The hub includes a body 10 having a shaft recess 12 in the rearward end thereof. The hub is driven by shaft (not shown) received in recess 12. Normally the hub is supported so that the cylindrical axis of recess 12 is horizontal. The body 10 has a cylindrical surface 14 coaxial with the axis recess 12. Cylindrical surface 14 is dimensioned to slidably receive the internal cylindrical opening of a tape reel. In order to secure the tape reel in position onto the cylindrical surface 14, means must be provided for releasably engaging the tape reel, and this means is the essence of the present invention.

Figure 3:
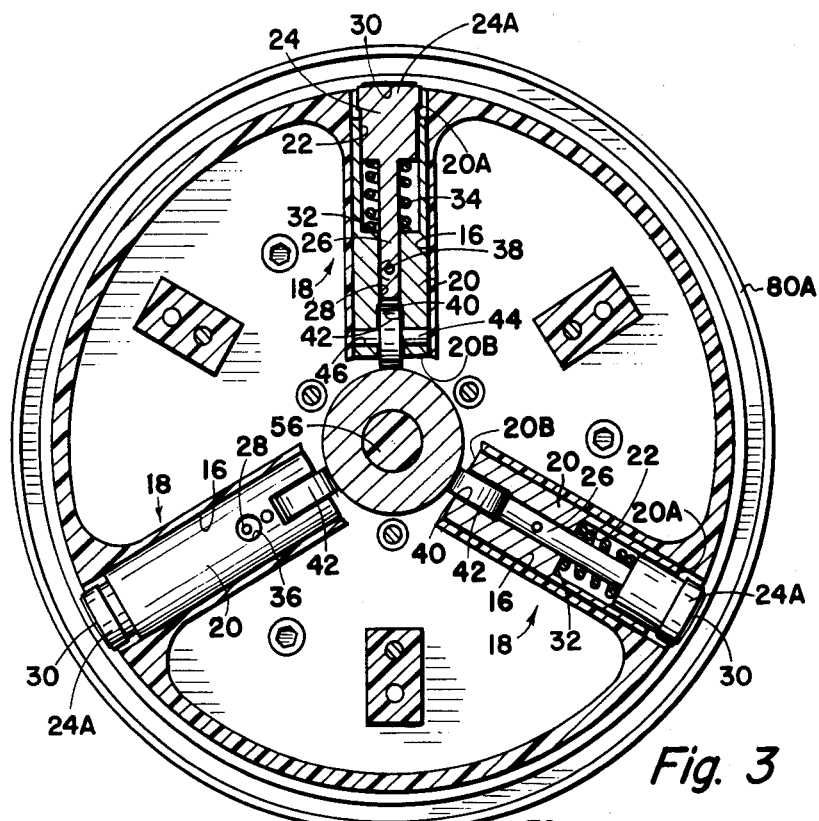
FIG. 3 is a cross-sectional view of the hub body taken along the line 3—3 of FIG. 1.

Body 10 has a plurality of spaced apart radial openings 16. In the illustrated arrangement three radial openings 16 are utilized as illustrated in FIG. 3 and a minimum of three is preferred; however, it can be seen that more than three may be employed in practicing the invention. Slidably received in each of the radial openings 16 is an actuator generally indicated by the numeral 18.

Each of the actuators 18 includes a cylindrical actuator body 20 having a forward end 20A and a rearward end 20B. Each of the actuator bodies 20 has a cylindrical axial recess 22 communicating with the outer end 20A thereof. Slidably positioned in recess 22 is a piston 24 having an integral reduced diameter piston rod 26 extending axially and rearwardly therefrom. The piston rod 26 is slidably received in a reduced diameter axial opening 28 in the piston body. The forward end 24A of the piston extends outwardly beyond the forward end 20A of body 20 and preferably includes an elastomeric pad 30. The interface between recess 22 and reduced diameter recess 28 in the actuator body provide an internal shoulder 32. Positioned between shoulder 32 and piston 24 is a spring 34.

A radial opening 36 is provided in body 20, the opening intersecting reduced diameter axial opening 28. Extending from piston rod 26 is a pin 38 which is received in opening 36. The diameter of opening 36 is substantially greater than the diameter of pin 38 so that limited axial displacement may take place between piston 24 and body 20, however, the pin retains the piston within the body.

The inward end 20B of the actuator body has a slot 40 therein which rotatably receives a roller 42 supported about an axle 44 which in turn is received in an opening 46 in the actuator body 20.

Each actuator 18, including the elements 20 through 46, is an independent assembly and is slidably positioned in an axial opening 16 in the hub body. A diametrical opening is provided in the hub body for each of the axial openings 16, each diametrical opening receiving a pin 50 extending from the actuator body 20. The diameter of each opening 48 is substantially greater than that of each pin 50 to allow limited axial movement of the actuators 18 with respect to the hub. Each pin 50 is inserted into the actuator body 20 after it is positioned in the axial opening 16 and retains the actuator within the hub but permits limited axial movement of the actuator relative to the hub.

Figure 4:
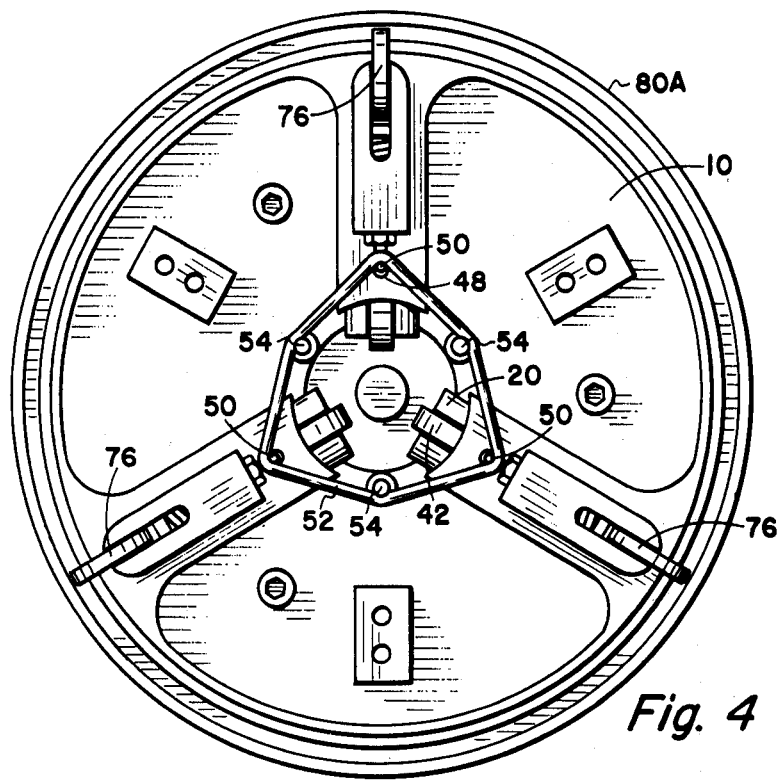
FIG. 4 is an elevational view taken along the line 4—4 of FIG. 1 showing the outward external appearance of the hub body with the cover removed.

To resilient bias the position of each of the hub bodies 20 in an inward direction, an elastomeric band 52 is stretched over the pins 50 as best seen in FIG. 4. To retain the elastomeric band 52 out of engagement with other devices, stakes 54 extend from the hub body as shown in FIGS. 2 and 4.

Figure 5:
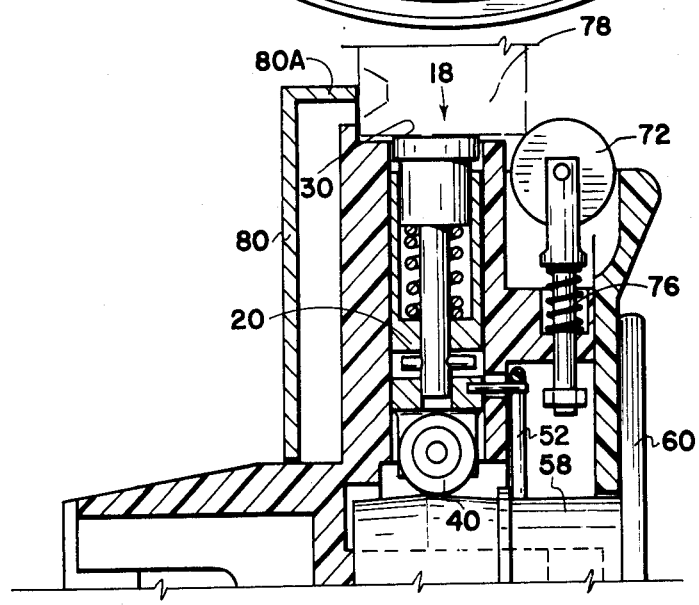
FIG. 5 is a partial cross-sectional external view as shown in FIG. 2 but showing the locking member in latched position and showing a reel in dotted outline.

The hub body includes an axial post 56 which slidably receives a locking member 58. Locking member 58 is axially displaced relative to the hub body and has at the outer end an integral handle portion 60. Adjacent the inner end 58A of the locking member there is provided on the external peripheral surface a forward circumferential inclined area 62 and, forwardly of that, a reclined circumferential area 64. The juncture of the areas 62 and 64 provides a circumferential peak 66. Rollers 42 engage the inclined area 62 adjacent the locking member inner end 58A when the locking member is in the outward position as shown in FIG. 2. Elastomeric band 52 urges the actuators 18 radially inwardly to maintain contact with the rollers 42. When the locking member 58 is moved radially inwardly towards the position shown in FIG. 5, the actuators 18 are moved radially outwardly by engagement of the rollers 42 with inclined surface 62. After the locking member 58 is moved sufficiently inward, the peak 66 between surfaces 62 and 64 passes the center line of the rollers 42; and when the locking member is fully inwardly depressed, as shown in FIG. 5, each of the actuator rollers 42 engages the reclining surface 64 immediately adjacent peak 66. Thus, when the locking member is fully inwardly depressed, the actuator members 18 are moved radially outwardly and are retained in this radial outward position.

A cover 68 is received on the hub body 10. A flange 70 on the locking member 58 retains it in slidable position relative to the hub when the cover 68 is in position.

To retain a tape reel in position on the hub, even when the locking member is in the unlocked position as shown in FIG. 2, there is provided a plurality of rollers 72, each supported by a rod 74 radially carried by the hub body 10, the hub 74 and rollers 72 being spaced forwardly of the actuators 20. A spring 76 urges the rollers 72 in an outward direction. When a reel is placed on the hub, it engages rollers 72 and compresses springs 76. When the reel, which is indicated in dotted outline and identified by numeral 78 in FIG. 5, is in position on the hub, springs 76 serve to hold the rollers 72 outward and retain the reel in proper position. The force supplied by rollers 72 is not sufficient to lock the reel 78 to the hub sufficient to transfer torque from the hub to the reel as the hub is rotated in normal tape transport functions; instead, the rollers 72 serve merely to retain the reel 78 in position prior to locking operation which is accomplished by the axial movement of the locking member 58.

A circumferential member 80 is retained on the external rearward portion of hub body 10 and held in place by studs 82 extending from the body and springs 84. When a reel positioned on the hub contains a so-called "write enable ring" (not shown), the member 80 will be rearwardly displaced. This displacement is then sensed by optical sensor (not shown).

FIG. 2 shows the hub with the locking member 58 in the unlocked position and without a reel on the hub. When the operator places a reel on the hub, the rollers 72 are inwardly displaced as the axial opening 78A of the reel passes the rollers, after which the rollers slightly outwardly are extended to hold the reel 78 in its position on the hub. The reel is then in proper position on the hub, however, it is not rotatably locked to the hub. To accomplish this, the operator pushes locking member 58 inwardly by manually engaging handle portion 60 which is in the form of a flat disc. As the locking member 58 moves inwardly, rollers 42 of each of the actuators 18 engage the inclined surface 62 to slidably axially outwardly displace body 20 of each of the actuators. The outward displacement continues until the elastomeric pad 30 of each of the actuators 18 engages the internal cylindrical surface 78A of the reel. Further inward displacement of the locking member 58 causes the piston 24 of each actuator to displace inwardly relative to the actuator bodies 20, compressing springs 34. After the locking member 58 has been pushed the full inward position, the rollers 42 of each actuator pass over the peak 68 and the rollers engage the reclining circumferential surface 64, allowing a very slight inward displacement of each of the actuator bodies 20. This serves to retain the actuator 48 in the locked position. At the same time, the spring 34 of each of the actuators is compressed a preselected amount. Thus it can be seen that the actuators provide a preselected loading on the reel. The preselected minimum loading is determinable by the initial compression of each of the actuator springs 34. This minimum compressive force, which is always supplied to the reel regardless of slight variations in the diameter of the reel's inner circumferential cylindrical opening 78A, ensures a positive slip-proof engagement of the hub with the reel.

The described apparatus provides an arrangement wherein each actuator 18 which is compressed until it develops minimum holding force and is held in this position by the actuator assembly. Any further compression of the actuator assembly achieves immediate minimal holding force and does not change very much with additional travel because of lower spring rate. An additional advantage is that it is easier to maintain dimensional tolerances of the actuator assembly and spring rate of the steel spring than to control the compressive force of elastomeric material such as rubber. The hub thereby is adaptable to engage reels when the tolerance of the cylindrical internal diameter of the reel may vary over a greater range while nevertheless providing a preselected minimal holding force.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A tape drive hub having an improved reel latch for a reel having an axial opening therein defined by an internal cylindrical surface, the tape drive hub being rotatable about its axis for driving the reel, comprising:
   (a) a hub body supported for rotation about its axis and having a cylindrical surface of dimension to slidably receive a reel thereon, the body having a plurality of spaced apart, radial openings therein communicating with the hub cylindrical surface;
   (b) an actuator received in each said hub body radial opening, each actuator comprising:
      (1) cylindrical body slidably received in a hub body radial opening, the cylindrical body having an outer end and an inner end, the outer end having an axial recess therein;
      (2) a piston slidably received in said recess in said cylindrical body having a forward end and rearward end, a portion of the piston forward end extending beyond said outer end of said body;
      (3) a spring received in said recess in said body urging said piston in the direction towards the cylindrical body outer end; and
      (4) means retaining said piston in said recess in said cylindrical body while providing limited axial movement of the piston; and
   (c) a locking member carried by and axially displaceable to said hub body engaging the inner end of each of said actuators, the locking member having a locking position in which each of said actuators is displaced outwardly.

2. A tape drive hub according to claim 1 wherein each said actuator piston includes an integral reduced diameter axial portion extending from the piston rearward end, said actuator cylindrical body having an internal reduced diameter recess coaxial with and communicating with said first mentioned recess receiving said piston reduced diameter portion, said actuator cylindrical body having an opening diametrical and intersecting said axial small diameter opening, and
   a pin affixed diametrically to said piston reduced diameter portion and received in said body diametrical opening, the diameter of the pin being less than the diameter of the body diametrical opening, and providing said means retaining said piston in said recess in said cylindrical body while providing limited axial movement of the piston.

3. A tape drive hub according to claim 1 wherein each said actuator cylindrical body includes
   a roller rotatably affixed to the actuator cylindrical body inner end about an axis perpendicular the body cylindrical axis, said locking member engaging said rollers to displace said actuators.

4. A tape drive hub according to claim 1 including an elastomeric pad affixed to the outer end of the said piston of each said actuator.

5. A tape drive hub according to claim 1 including means to normally urge said actuators inwardly.

* * * * *